Oct. 5, 1943.     F. W. GOLDTHWAIT     2,331,184
APPARATUS FOR THAWING FROZEN PRODUCTS
Filed Feb. 19, 1941     2 Sheets-Sheet 1
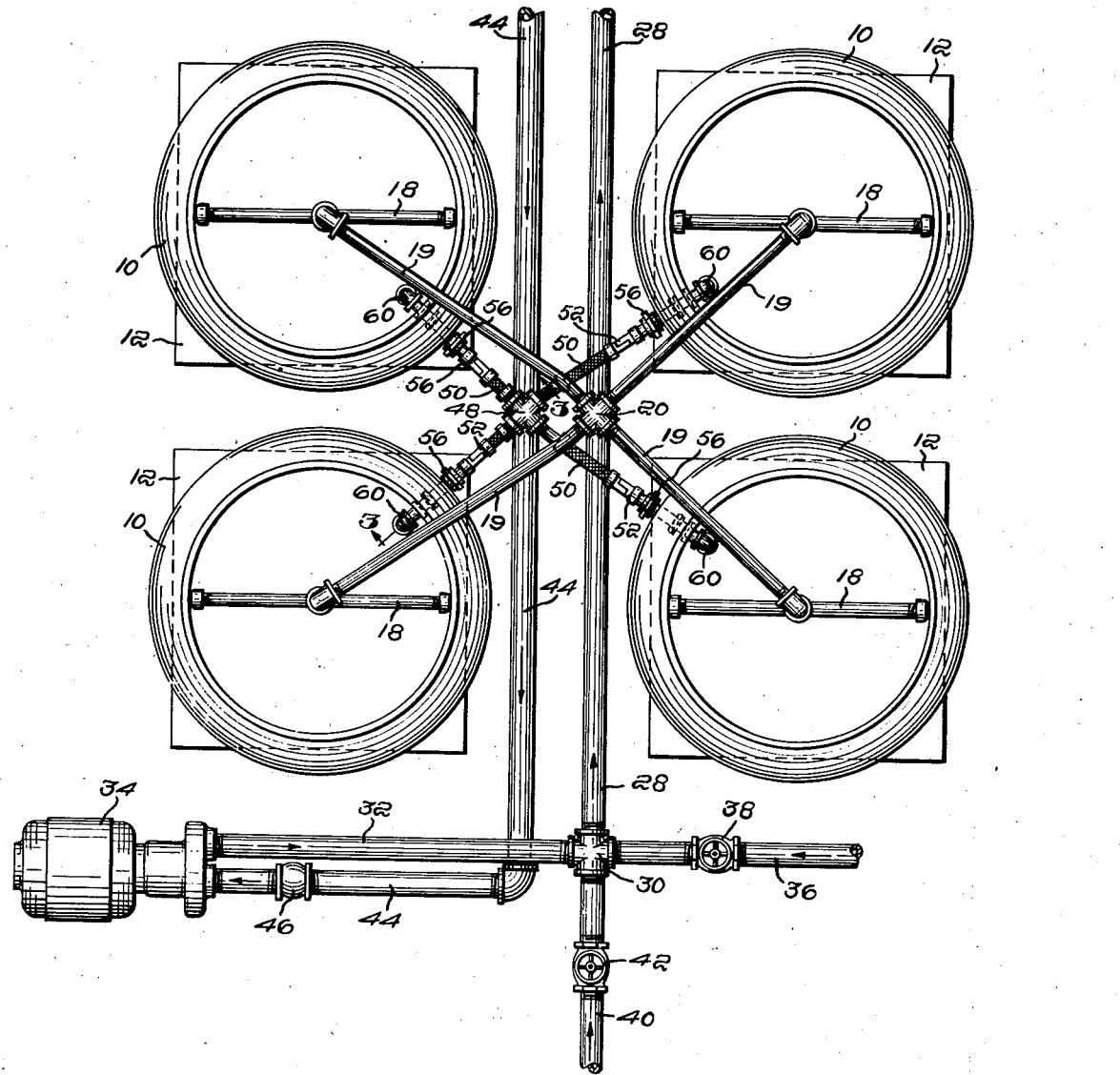

Oct. 5, 1943.  F. W. GOLDTHWAIT  2,331,184
APPARATUS FOR THAWING FROZEN PRODUCTS
Filed Feb. 19, 1941  2 Sheets-Sheet 2
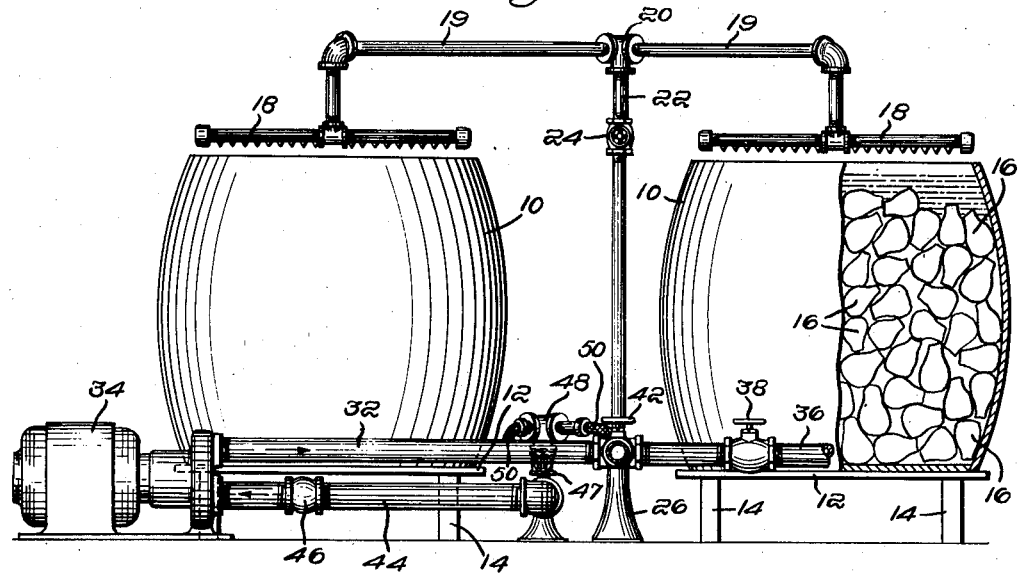
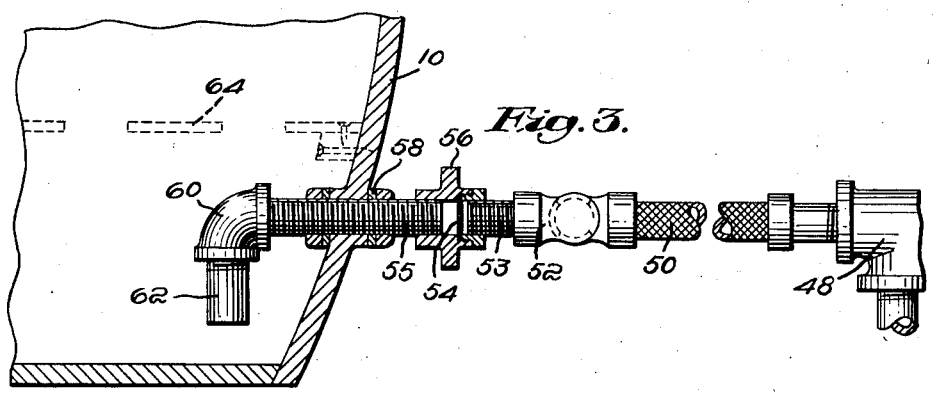
Inventor:
Fred Warren Goldthwait
by Kenway & Witter
Attorneys Patented Oct. 5, 1943

2,331,184

UNITED STATES PATENT OFFICE 2,331,184

APPARATUS FOR THAWING FROZEN PRODUCTS

Fred Warren Goldthwait, Melrose, Mass.

Application February 19, 1941, Serial No. 379,733

3 Claims. (Cl. 99—234)

My invention relates to the thawing of frozen products, particularly frozen meat such as hams or the like. Animals are usually slaughtered at special seasons in great numbers so that it is neither possible nor desirable to cure the meat products simultaneously. Consequently the meat products are frozen and kept in cold storage until they are wanted for curing.

Frozen meat is often shipped in refrigerator cars from the great packing centers to various curing plants located about the country. The consignee must first thaw the meat before it can be cured, and the general practice has been to put the frozen meat in vats of water, let it stand from three to five days. In this procedure the water of the vat is first frozen by the cold meat into a solid cake and then this ice and the meat embedded therein gradually thaw over a period of days.

It is the object of my invention to provide an apparatus for thawing frozen meat, by means of which the time of thawing can be materially reduced and the formation of ice substantially eliminated.

My invention utilizes the principle that water will not freeze while it is sufficiently agitated. Accordingly, I have arranged to spray water into the top of a product-containing vat and simultaneously to withdraw water from the bottom of the vat for recirculation. Thus the surface of the water is subjected to constant agitation, while the remainder of the water is agitated by flowing to the outlet at the bottom of the vat.

One feature of my invention resides in a novel system of pipes, connections and valves so arranged that portable vats may be employed to cart the meat from the refrigerator cars or trucks to the thawing location and from thence to the curing location, and at the same time adapted to be detachably and selectively incorporated in the unitary system in operative relation to a spray head and an outlet connection.

An important advantage resulting from the use of my invention is that the pieces of meat require much less handling than is the case when permanent vats are employed. Furthermore the task of breaking out chunks of ice from the vats to free the meat is entirely eliminated.

These and other objects and features of my invention will more readily be understood and appreciated from the following detailed description of a preferred embodiment thereof, selected for purposes of illustration as the best mode of practicing the invention, and shown in the accompanying drawings, in which:

Fig. 1 is a plan view of a battery of vats and associated apparatus for thawing frozen products, Fig. 2 is a view in side elevation of the apparatus shown in Fig. 1, and Fig. 3 is a view in cross section along the line 3—3 of Fig. 1, showing the connections to the bottom of the vat.

As shown in the drawings I provide a battery of vats 10 of conventional size and shape, preferably made of wood. The bottoms of the vats are secured to flat bases 12 which are supported by supports or legs 14 so arranged that a hand truck can be run between the legs and under the base. It will be understood that with this arrangement the vats and their bases can be moved about with facility. I contemplate wheeling each vat to a point adjacent a refrigerator car and then loading the vat with frozen meat taken from the car. The appearance of a loaded vat is suggested in Fig. 2 wherein appear a number of hams 16 or other meat products. When each vat has been loaded, it is trundled back to a position beneath an overhead spray head. As shown in Fig. 1 there are four vats and four of such heads comprising horizontal spray pipes 18, but it will be understood that the number of vats may be varied as desired. Each spray head or pipe 18 is connected through a pipe 19 to a cross 20 to which leads a vertical supporting pipe 22 mounted on a standard 26. A hand shut-off valve 24 is placed in the pipe 22. A lower horizontal pipe 28 connects the vertical pipe 22 to another cross 30 located outside the group of vats, and a pipe 32 connects the cross 30 to the discharge end of a pump 34. The size and type of pump is not important and these factors will depend upon the extent of the installation, particularly the number of vats used. The cross 30 is also connected to a pipe 36 controlled by a hand shut-off valve 38 and a similar pipe 40 having a valve 42. The pipes 36 and 40 may conveniently be used for the introduction of tap water or hot water, the latter being used occasionally to temper the water being circulated in the thawing apparatus. The tap water is used to replenish the system and make up for occasional losses therein. From the suction end of the pump 34 leads a pipe 44 in which is contained a check valve 46. The pipe 44 leads through a hand shut-off valve 47 and a short riser to a cross 48 from which lead four flexible hose connections 50.

Referring particularly to Fig. 3, it will be observed that the flexible hose connection 50 leads in each case to a coupling 52, preferably of the type which can be easily connected and disconnected. One end of the coupling 52 is threaded on a pipe 53 upon the end of which is secured a strainer 54, held in place by a flanged union 56. The union is also threaded for connection with the outlet of the vat consisting in a pipe 55 which leads from the interior of the vat 10, suitable packing 58 being employed to prevent leakage. Upon the inner end of the pipe 55 is an elbow 60 carrying a downwardly directed nipple 62. As an alternative form of construction a foraminous false bottom 64, having relatively large holes may be secured to the wall of the vat below the hose of the pipe 55.

The operation of the apparatus will have been suggested from the foregoing description. Briefly speaking, when the desired and selected vats containing the frozen meat product have been assembled in the system water is discharged into the product containing vats through the spray pipes 18 which are spaced at some distance above the tops of the vats. The pump is arranged to deliver the water under relatively high pressure so that it is sprayed into the vats with a high velocity. The result is that the surface of the water in each vat is continuously agitated. The pump 34 sucks the water from the bottom of the vats and re-circulates it to the spray pipes 18, sufficient water being used to keep the vats substantially full at all times. The effect of the false bottoms is to cause agitation of the water near the bottom of the vats and thus prevent the formation of static pockets in which ice will form. The result is that the water at the top of the vats is constantly agitated as is the water at the bottom of the vats. The water in between is flowing down among the pieces of meat. It will also be understood that all of the water in the pipe is constantly flowing and not at rest. I have discovered that when the water is allowed to remain static, it freezes in a very short time, but if the water in the system is constantly kept in motion it cannot freeze. This factor reduces the thawing time from approximately four days to less than two days and completely eliminates the arduous task of breaking up the solid mass of ice in the vats and removing the meat therefrom. I use water from city mains which averages 50° to 70° F., and this is important because water at a higher degree of temperature promotes rapid bacterial growth and consequent rotting of the meat. The expense is also much less than would be the case if brine were used as a means to reduce the freezing point.

It will be understood that the vats are disconnected by first closing the valves 47 and 24 and then disconnecting the coupling 52. The hand trucks may then be run in beneath the bases 12 and the vats can be carried off to be unloaded. The fact that the vats are themselves portable saves the expense of providing other containers in which the product may be transported to and from the thawing apparatus. The spray pipes 18 are located permanently in a compact group at a height above the floor sufficient to permit any selected vat to be moved into place beneath any spray pipe without obstruction. The supply and return pipes are located centrally in the apparatus and thus leave free and unobstructed floor space over which the vats may be moved in being brought into operation or being removed with their contents of the thawed product.

The apparatus shown in the drawings is the best means of practicing the invention now known to me although the scope of my invention is not limited to the precise system herein shown. For example, each vat may be supplied by a plurality of spray pipes and the false bottoms may be dispensed with in some cases without ill effect.

Having thus described my invention what I claim as new and desire to secure by Letters Patent of the United States is:

1. Apparatus for thawing frozen meat products, comprising a series of spray pipes maintained at predetermined height in a group above the floor, a shut-off valve controlling the individual group of spray pipes, a plurality of vats each provided with a return outlet near its bottom and each movable independently upon the floor into position beneath one of the spray pipes, supply and return pipes located beneath the group of spray pipes and centrally within the outline of the group, and flexible detachable return connections extending outwardly from the return pipe to the outlet of each vat, whereby any vat may be brought into or moved out of operative relation to an overhead spray and a return connection.

2. Apparatus for thawing frozen meat products, comprising a series of spray heads located in a compact group above the floor, a supply pipe for the group of spray heads having a shut-off valve therein, a plurality of vats each provided with a return outlet near its bottom and each movable independently upon the floor into position beneath a spray head, a return pipe leading approximately to the center of the group of vats, and flexible detachable return connections extending outwardly from the return pipe to the outlet of each vat, whereby any vat may be brought into or out of operative relation to an overhead spray and a return connection.

3. Apparatus for thawing frozen meat products, comprising a circulating system including a vertical riser having branches extending to a series of spray pipes located above the floor in a compact group, a shut-off valve in the riser for controlling the group of spray pipes, a plurality of vats each movable independently on the floor into position beneath a spray pipe and each having a permanent outlet element projecting outwardly near its bottom, return connections including a head located centrally among said vats adjacent to the floor, flexible detachable connections extending outwardly from said head whereby any selected vat may be installed in operative relation beneath a spray pipe and provided with a return connection to its own outlet, and connections for supplying make-up water to the circulating system.

FRED WARREN GOLDTHWAIT.